US010036512B2

(12) United States Patent
Loga et al.

(10) Patent No.: US 10,036,512 B2
(45) Date of Patent: Jul. 31, 2018

(54) MULTI-DOUBLE BLOCK AND BLEED SYSTEM FOR AN ORIFICE FITTING

(71) Applicant: Daniel Measurement and Control, Inc., Houston, TX (US)

(72) Inventors: Thomas Henry Loga, Sugar Land, TX (US); Jon Stokes, Katy, TX (US); Peter Syrnyk, Houston, TX (US); Anthony E. Carter, Cameron, TX (US); Darren Schwarz, Cypress, TX (US); Ferenc Szucs, Katy, TX (US); Jerry Blankenship, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 267 days.

(21) Appl. No.: 14/963,950

(22) Filed: Dec. 9, 2015

(65) Prior Publication Data
US 2016/0169452 A1    Jun. 16, 2016

Related U.S. Application Data

(60) Provisional application No. 62/091,122, filed on Dec. 12, 2014.

(51) Int. Cl.
*F16K 11/20* (2006.01)
*F17D 3/10* (2006.01)
(Continued)

(52) U.S. Cl.
CPC ............. *F17D 3/10* (2013.01); *F17D 3/01* (2013.01); *F17D 5/02* (2013.01)

(58) Field of Classification Search
CPC ........... Y10T 137/0402; Y10T 137/598; Y10T 137/87249; Y10T 137/6113;
(Continued)

(56) References Cited

U.S. PATENT DOCUMENTS 1,938,460 A * 12/1933 Muff ..................... G01F 1/42
138/44
4,275,763 A * 6/1981 Fahrig ................... F16K 3/029
137/375
(Continued)

FOREIGN PATENT DOCUMENTS

EP        0560303 A2    9/1993
WO    2014/124514 A1    8/2014

OTHER PUBLICATIONS

PCT/US2015/064726 International Search Report and Written Opinion dated Feb. 23, 2016 (20 p.).

*Primary Examiner* — Jessica Cahill
(74) *Attorney, Agent, or Firm* — Conley Rose, P.C.

(57) ABSTRACT

A system and method for providing a multi-double block and bleed configuration in an orifice fitting to provide an additional barrier of protection between the pressurized flow stream and the environment outside the flowmeter. The multi-double block and bleed system includes a first pair of blocking valves located below a second pair of blocking valves. The multi-double block and bleed system further includes a first vent valve positioned between blocking valves of the first pair blocking valves, a second vent valve positioned between blocking valves of the second pair of blocking valves, and a third vent valve positioned between the first and second pairs of blocking valves. The pairs of blocking valves and the vent valves are arranged to provide double block and bleed during all phases of orifice plate installation and removal.

25 Claims, 12 Drawing Sheets

(51) Int. Cl.
*F17D 3/01* (2006.01)
*F17D 5/02* (2006.01)

(58) Field of Classification Search
CPC ...... Y10T 137/0491; G01F 1/42; B23P 17/04; G01L 13/00; F17D 3/10; F17D 3/01; F17D 5/02
See application file for complete search history.

(56) References Cited

U.S. PATENT DOCUMENTS

| | | | | |
|---|---|---|---|---|
| 4,425,806 A | * | 1/1984 | Van Scoy | G01F 1/42 |
| | | | | 138/44 |
| 4,476,730 A | * | 10/1984 | Brumm | G01F 1/42 |
| | | | | 138/94 |
| 5,094,270 A | * | 3/1992 | Reimert | F16K 3/029 |
| | | | | 137/614.11 |
| 5,148,829 A | * | 9/1992 | Deville | G01F 1/42 |
| | | | | 137/486 |
| 5,464,036 A | | 11/1995 | Tomkins et al. | |
| 5,474,103 A | | 12/1995 | Klak | |
| 5,836,356 A | * | 11/1998 | Desai | G01F 1/42 |
| | | | | 138/44 |
| 2007/0186987 A1 | | 8/2007 | Loga et al. | |
| 2013/0180614 A1 | * | 7/2013 | Pila Gonzalez | F16K 3/0272 |
| | | | | 138/44 |
| 2015/0352674 A1 | * | 12/2015 | Clark | G01F 1/42 |
| | | | | 137/15.18 |

* cited by examiner

MULTI-DOUBLE BLOCK AND BLEED SYSTEM FOR AN ORIFICE FITTING

CROSS-REFERENCE TO RELATED APPLICATIONS

This application claims benefit of U.S. provisional patent application Ser. No. 62/091,122 filed Dec. 12, 2014, and entitled "Multi-Double Block and Bleed System for an Orifice Fitting," which is hereby incorporated herein by reference in its entirety.

STATEMENT REGARDING FEDERALLY SPONSORED RESEARCH OR DEVELOPMENT

Not applicable.

BACKGROUND

In pipeline operations and other industrial applications, orifice flowmeters are used to measure the volumetric flow rate of a gaseous or liquid flow stream moving through a piping section. The pressure in the flowmeter can be high, so a need exists to provide an additional barrier of protection between the pressurized flow stream and the environment outside the flowmeter.

BRIEF SUMMARY OF THE DISCLOSURE

In one embodiment, a multi-double block and bleed system for use with an orifice fitting includes an orifice plate transfer passage through which an orifice plate is moved in the flowmeter, and four blocking valves disposed in series in the orifice plate transfer passage, where each of the blocking valves is configured to block escape of fluid from the flowmeter through the orifice plate transfer passage. The multi-double block and bleed system further includes three vent valves, each of the vent valves disposed between two adjacent ones of the blocking valves, and configured to provide an outlet for fluid in the orifice plate transfer passage. In addition, the four blocking valves include a bottom valve that is adjacent to a lower chamber of the flowmeter, a lower valve that is adjacent to the bottom valve, a top valve that is farthest of the blocking valves from the lower chamber, and an upper valve that is disposed between the lower valve and the top valve.

In one embodiment, a method for providing a multi-double block and bleed configuration for an orifice fitting includes opening a bottom valve of a first pair of valves disposed between an upper chamber of the flowmeter and a lower chamber of the flowmeter, and above an orifice plate disposed in the lower chamber, where the orifice plate is in fluid communication with a pipeline. The method further includes maintaining a lower valve of the first pair of valves in a closed position, and maintaining a second pair of valves, disposed above the first pair of valves and in the upper chamber of the flowmeter, in a closed position. The method also includes maintaining a first vent valve, disposed between the lower and bottom valves of the first pair of valves, in a closed position, and opening a second vent valve disposed between valves of the second pair of valves. The method further includes maintaining a third vent valve, disposed in the upper chamber above the first pair of valves and below the second pair of valves, in a closed position.

In one embodiment, an orifice fitting having a multi-double block and bleed system includes a body having a lower chamber and an upper chamber, and an orifice plate disposed in the lower chamber and in fluid communication with a pipeline. The orifice fitting further includes four blocking valves disposed in series in an orifice plate transfer passage that extends from the pipeline through the lower and upper chambers, each of the blocking valves is configured to block escape of fluid from the flowmeter through the orifice plate transfer passage. The orifice fitting also includes three vent valves, each of the vent valves disposed between two adjacent ones of the blocking valves, and are configured to provide an outlet for fluid in the orifice plate transfer passage. Moreover, the four blocking valves include a bottom valve that is adjacent to pipeline, a lower valve that is adjacent to the bottom valve, a top valve that is farthest of the blocking valves from the pipeline, and an upper valve that is disposed between the lower valve and the top valve.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
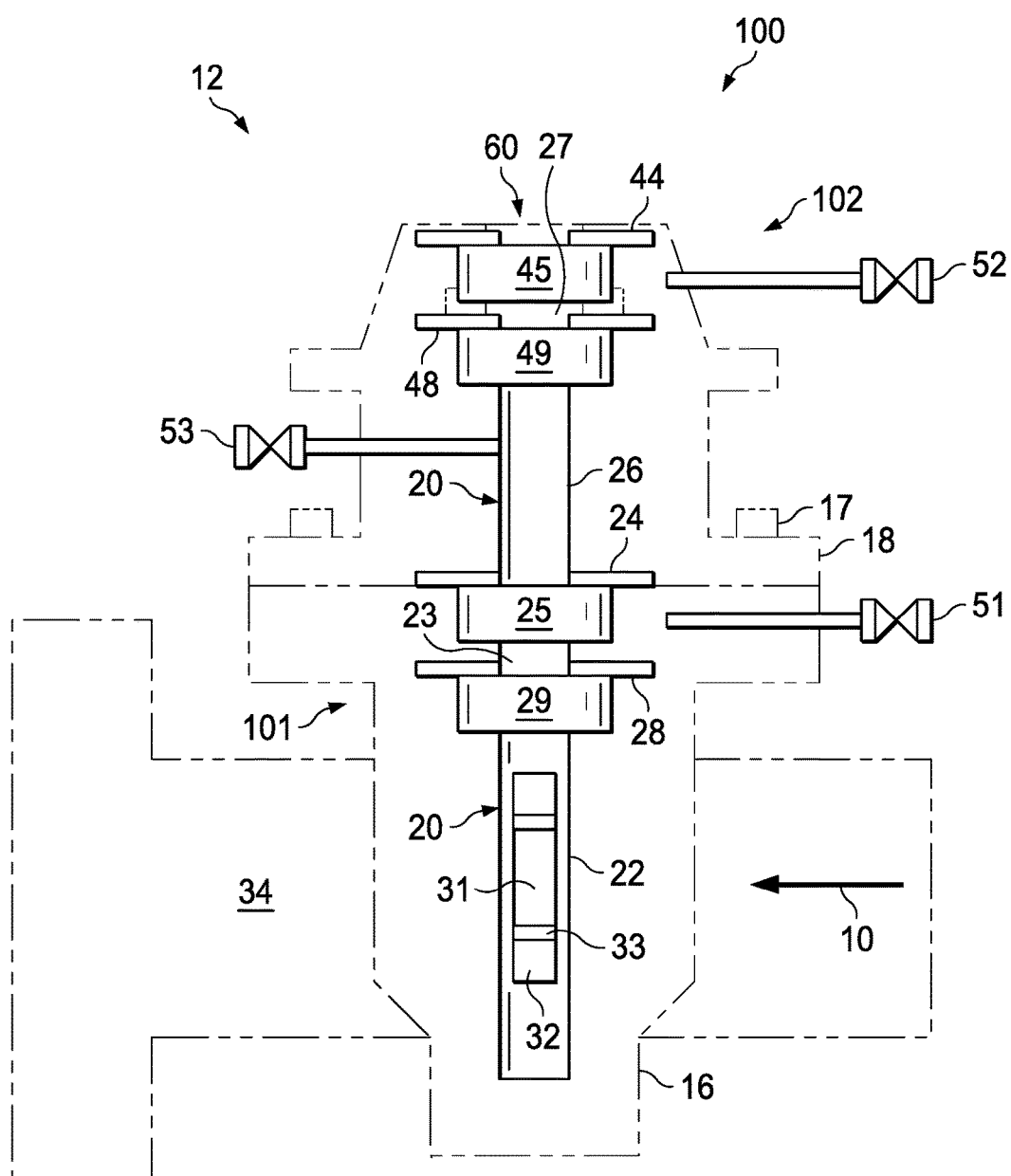
FIG. 1 is a partial sectional side view of an orifice fitting with a multi-double block and bleed system in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, a sectional view of an example of an orifice fitting or orifice flowmeter 12 is illustrated. A multi-double block and bleed system 100 is installed on an orifice flowmeter 12. The multi-double block and bleed system 100 provides pressure-regulated access to the flowmeter 12.

Referring still to FIG. 1, orifice flowmeter 12 is located in a work area or environment 5 and includes body 16 and top 18. Top 18 encloses upper chamber 26 and is connected to body 16 by bolts 17. Body 16 encloses lower chamber 22, which is in fluid communication with the interior of pipeline 34. A flow stream or energy source 10 flows through pipeline 34. An orifice 31 is located on an orifice plate 33 supported by an orifice plate carrier 32. Orifice plate carrier 32 is shown in a metering position in the lower chamber 22 of the flowmeter 12 and in alignment with pipeline 34.

The multi-double block and bleed system 100 includes a first or lower pair of blocking valves 101, a second or upper pair of blocking valves 102, and a first, second, and third vent valve 51, 52, 53, respectively. The first or lower pair of blocking valves 101 is disposed in the lower chamber 22 of the flowmeter 12 and comprises a top lower blocking valve 25 and a bottom lower blocking valve 29 that form a lower blocking valve chamber 23 therebetween. For simplicity, the top lower blocking valve 25 will hereafter be referred to as the lower blocking valve 25, and the bottom lower blocking valve 29 will hereafter be referred to as a the bottom blocking valve 29. The second or upper pair of blocking valves 102 is disposed in the upper chamber 26 of the flowmeter 12 and comprises a top upper blocking valve 45 and a bottom upper blocking valve 49 that form an upper blocking valve chamber 27 therebetween. For simplicity, the top upper blocking valve 45 will hereafter be referred to as the top blocking valve 45, and the bottom upper blocking valve 49 will hereafter be referred to as the upper blocking valve 49. An orifice plate transfer passage 20 extends from and connects the lower chamber 22 through the lower blocking valve chamber 23, the upper chamber 26, and the upper blocking valve chamber 27 to an opening 60. The orifice plate carrier 32 is moved within the orifice plate transfer passage 20 of the flowmeter 12 with a drive mechanism (not shown) while controlling and venting the pipeline pressure within the lower chamber 22, the lower blocking valve chamber 23 via the first vent valve 51, the upper blocking valve chamber 27 via the second vent valve 52, and the upper chamber 26 via the third vent valve 53.

The first or lower pair of blocking valves 101 further include a bottom valve seat 28 disposed in the orifice plate transfer passage 20 and coupled to body 16 to provide a sealing engagement with bottom blocking valve 29, which is in fluid communication with the energy source 10 flowing through the interior of the pipeline 34 and the lower chamber 22. When bottom blocking valve 29 is closed, it blocks or prevents the flow stream 10 in the pipeline 34 from flowing beyond the bottom blocking valve 29. A lower valve seat 24 is disposed in the orifice plate transfer passage 20 above the bottom blocking valve 29 and coupled to top 18 to provide a sealing engagement with upper blocking valve 25. When lower blocking valve 25 is closed, it blocks or prevents the flow stream 10 in the pipeline 34 from flowing beyond the lower blocking valve 25. The lower blocking valve 25 and bottom blocking valve 29 are slidably actuated by rotating gear shafts (not shown).

A top valve seat 44 is disposed in the orifice plate transfer passage 20 and coupled to top 18 to provide a sealing engagement with top blocking valve 45, which is proximate opening 60 and disposed farthest from the pipeline 34. When top blocking valve 45 is closed, it blocks or prevents flow of the flow stream 10 from the pipeline 34 from flowing beyond the top blocking valve 45. An upper valve seat 48 is disposed in the orifice plate transfer passage 20 below the top blocking valve 45 and coupled to top 18 to provide a sealing engagement with upper blocking valve 49. When upper blocking valve 49 is closed, it blocks or prevents flow of the flow stream 10 from the pipeline 34 from flowing beyond the upper blocking valve 49. The top blocking valve 45 and upper blocking valve 49 are slidably actuated by rotating gear shafts (not shown). Vent valves 51, 52, 53, lower and bottom blocking valves 25, 29, respectively, and top and upper blocking valves 45, 49, respectively, may be any suitable valve known in the art including, but not limited to, a plug valve, a slide valve, a rotary valve, and a ball valve.

Figure 2:
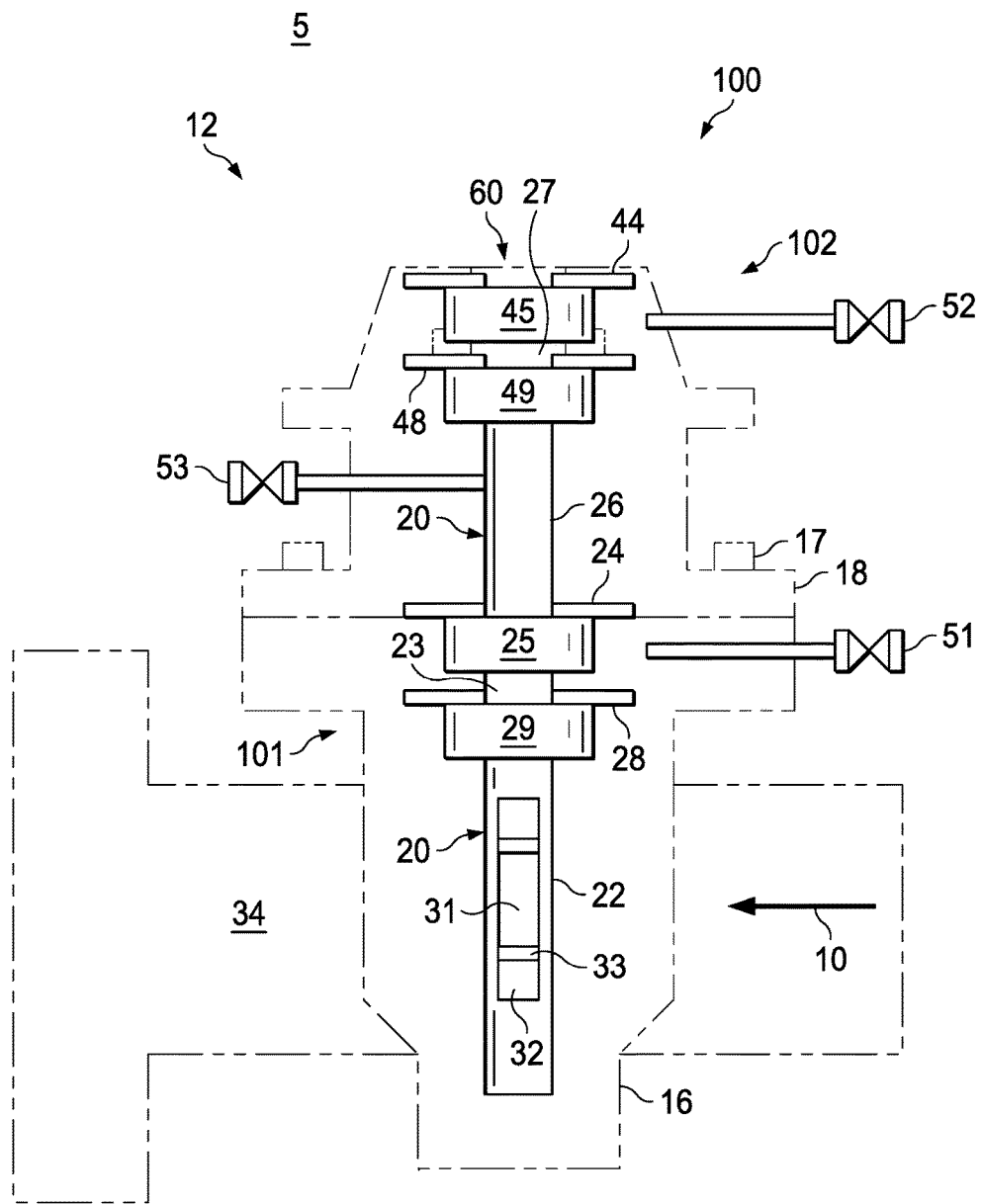
FIG. 2 is a partial sectional side view of the fitting and multi-double block and bleed system of FIG. 1.
Figure 3:
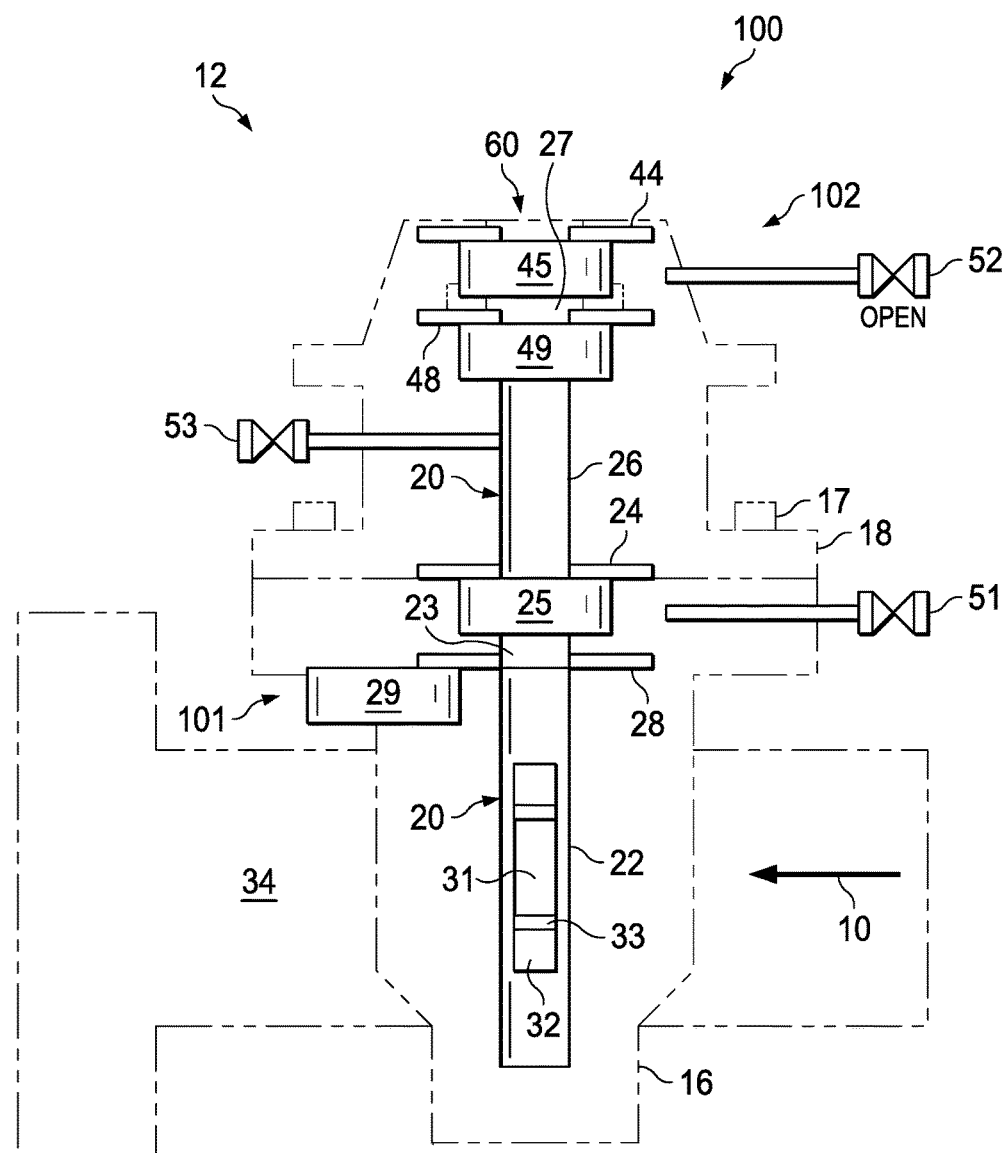
FIG. 3 is a partial sectional side view of the fitting and multi-double block and bleed system of FIG. 2 with a bottom blocking valve open.
Figure 4:
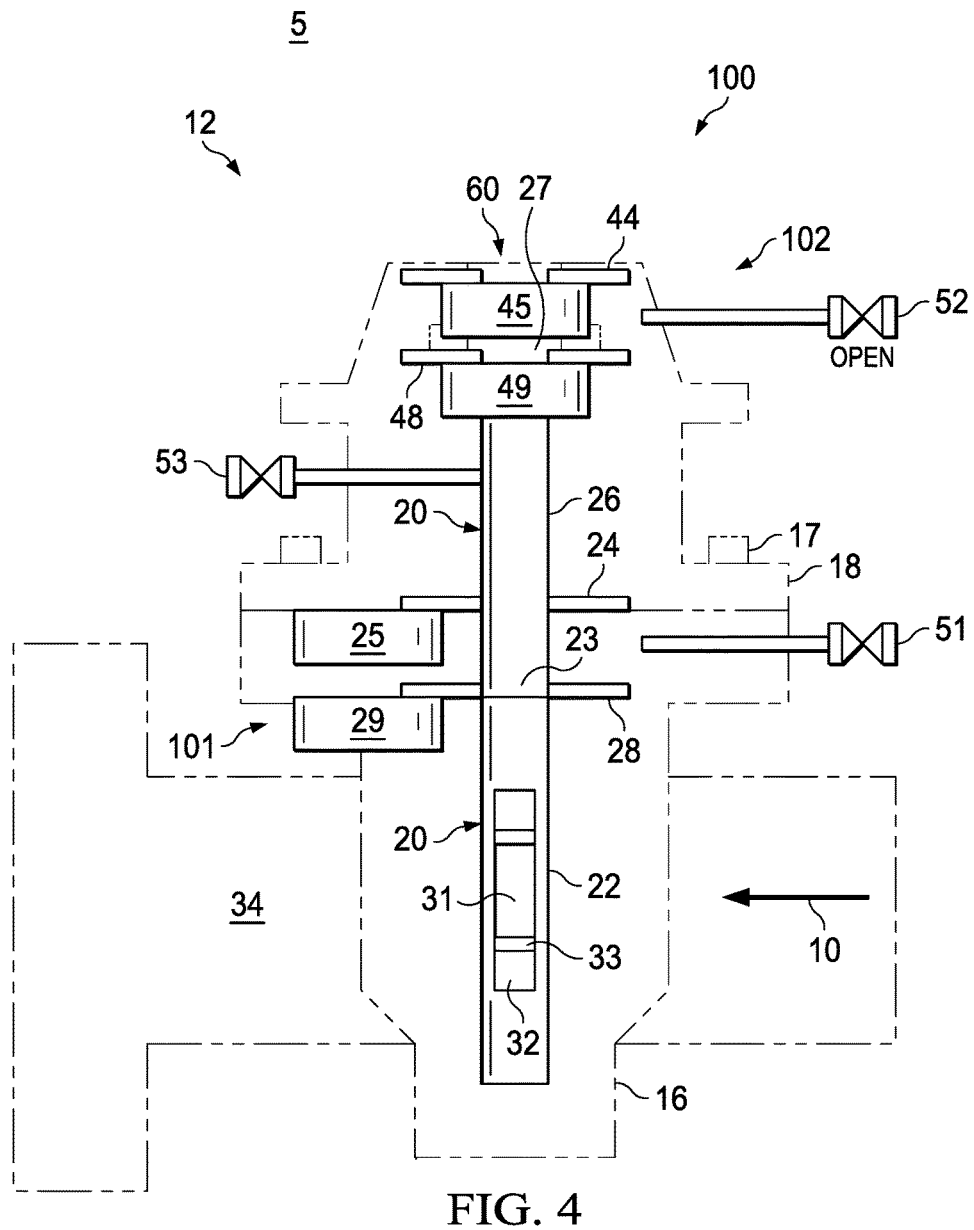
FIG. 4 is a partial sectional side view of the fitting and multi-double block and bleed system of FIG. 2 with a lower blocking valve and the bottom blocking valve open.

Referring now to FIGS. 2-4, to remove the orifice plate carrier 32 from flowmeter 12, rotating gear shafts are actuated to slide lower and bottom blocking valves 25, 29, respectively, laterally and away from lower and bottom valve seats 24, 28, respectively. First, the second vent valve 52 is opened to vent the pressure in the upper blocking valve chamber 27 between the top and upper blocking valves 45, 49, respectively. The bottom blocking valve 29 is opened (FIG. 3), and then the lower blocking valve 25 is opened (FIG. 4), placing the interior of pipeline 34 in fluid communication with the lower chamber 22, lower blocking valve chamber 27, and the upper chamber 26 below the second pair of blocking valves 102. The top blocking valve 45 and upper blocking valve 49 are closed, providing double block and bleed protection between the environment 5 and the energy source 10 in the pipeline 34.

Figure 5:
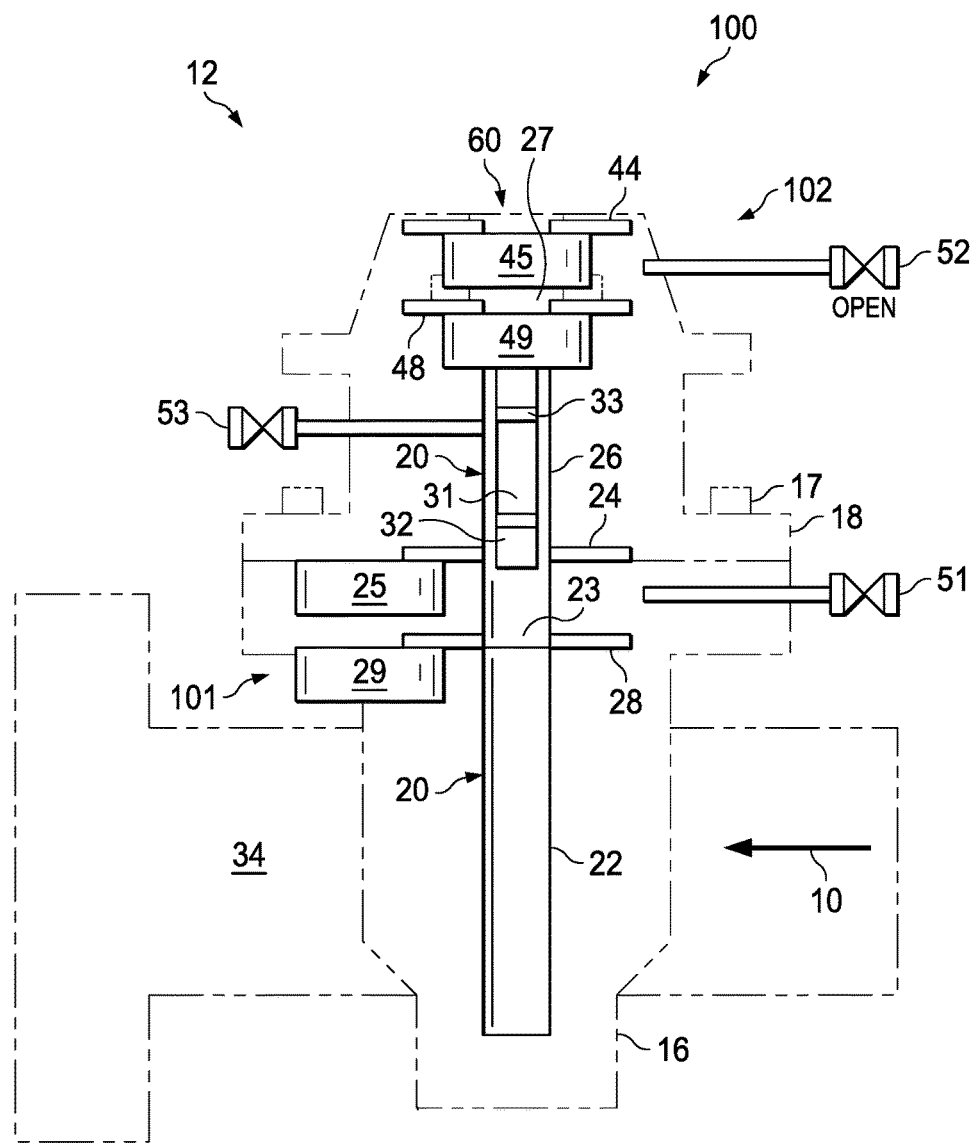
FIG. 5 is a partial sectional side view of the fitting and multi-double block and bleed system of FIG. 2 with an orifice plate positioned in an upper chamber of the fitting.
Figure 6:
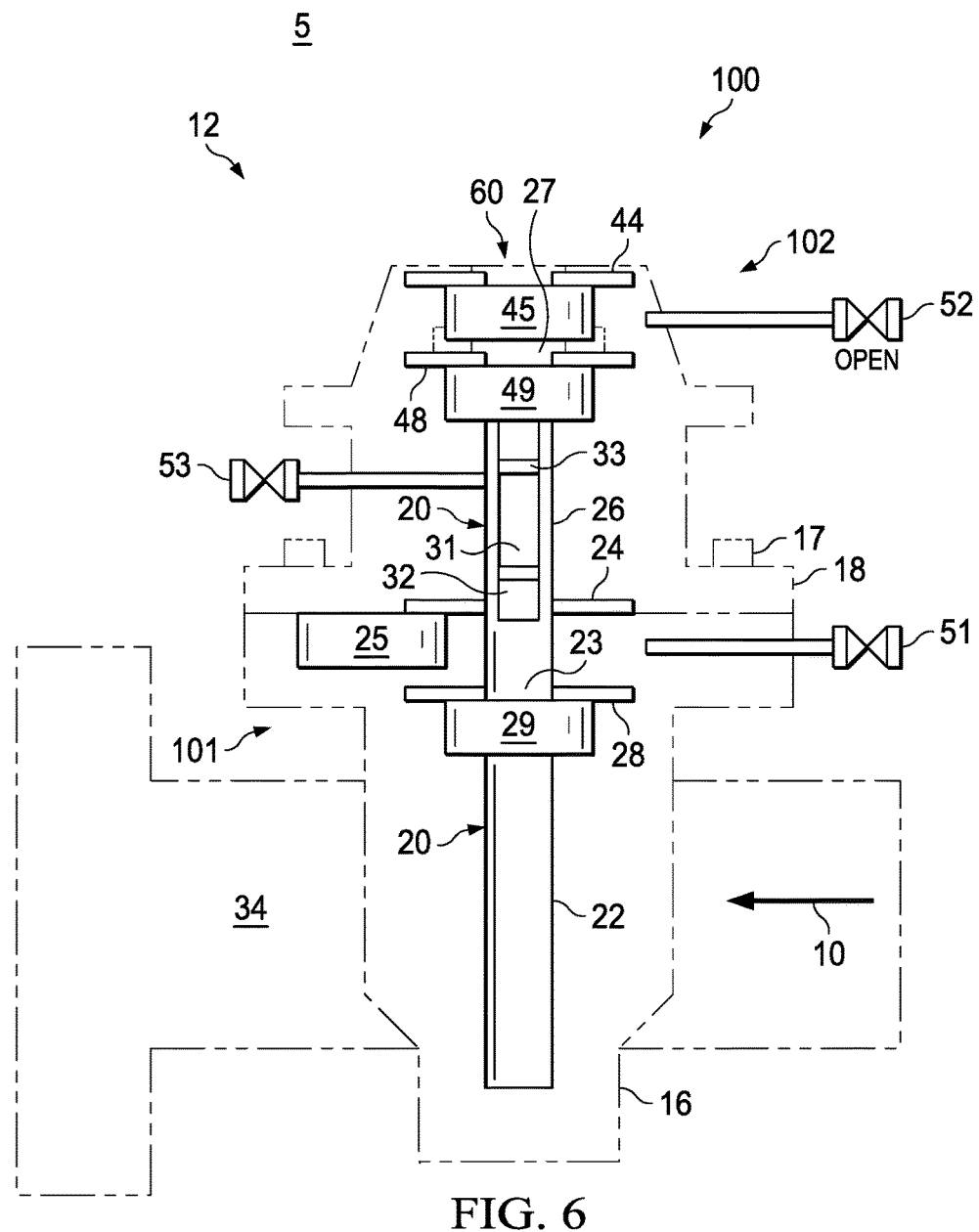
FIG. 6 is a partial sectional side view of the fitting and multi-double block and bleed system of FIG. 2 with the bottom blocking valve closed.
Figure 7:
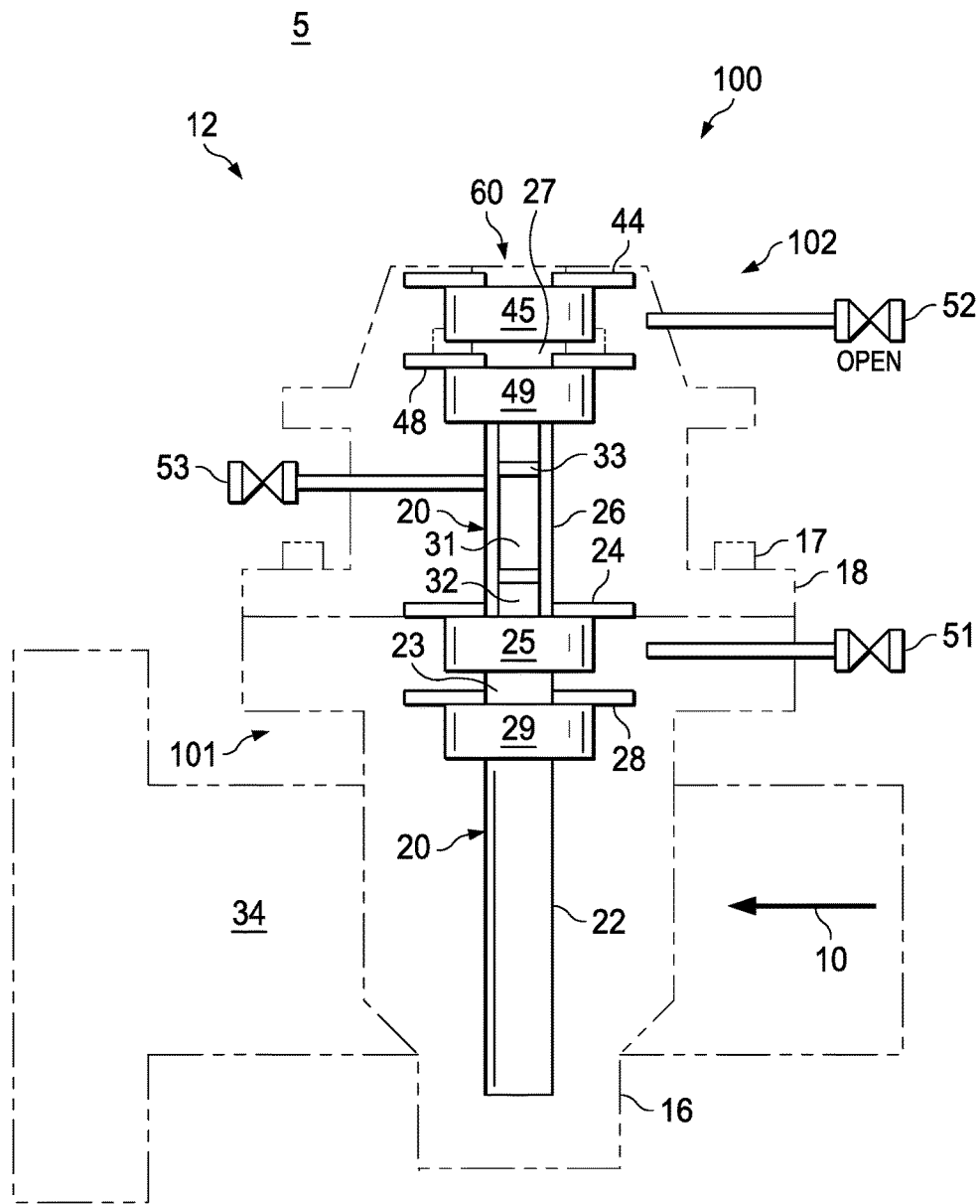
FIG. 7 is a partial sectional side view of the fitting and multi-double block and bleed system of FIG. 2 with the lower blocking valve and bottom blocking valve closed.
Figure 8:
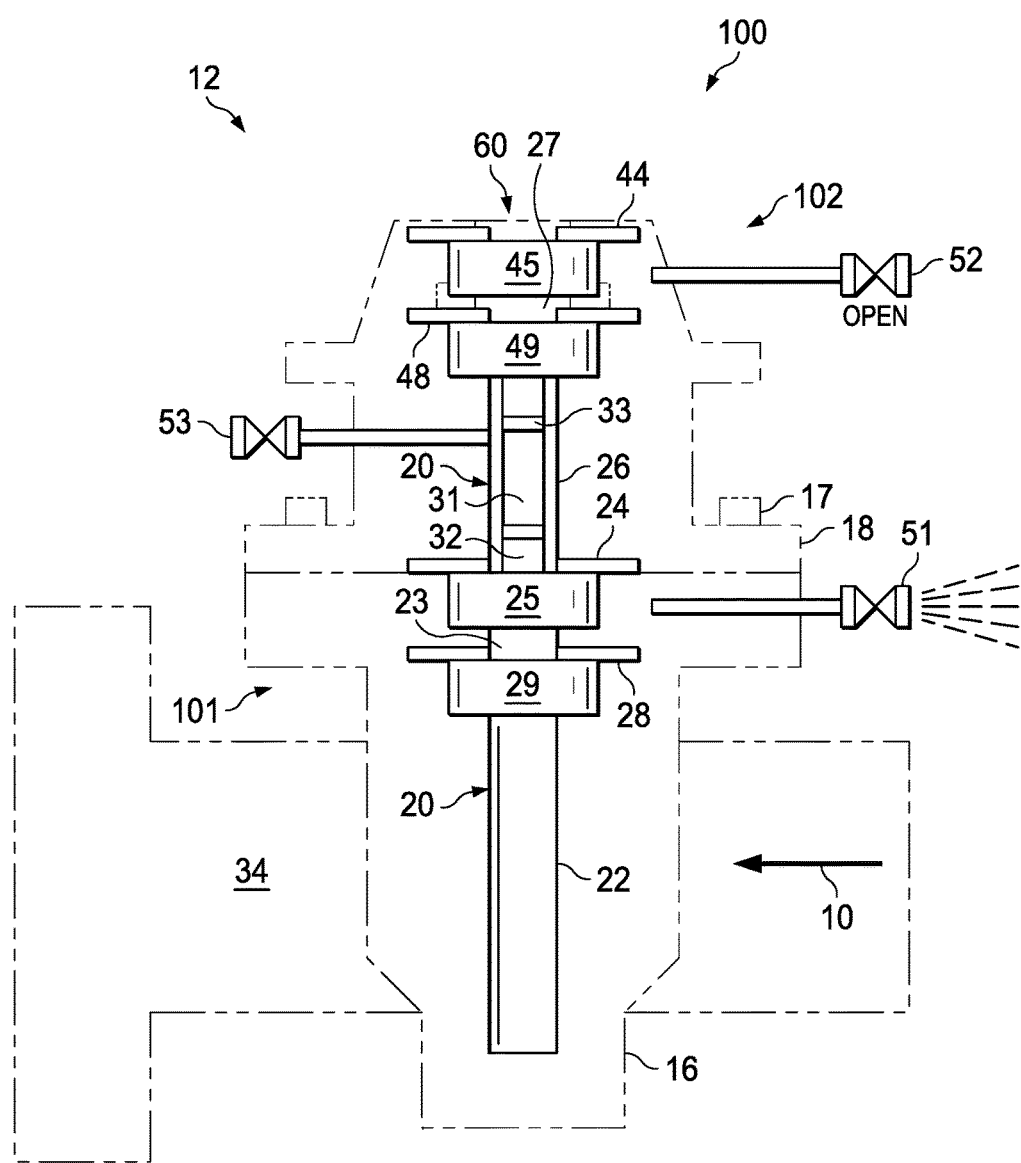
FIG. 8 is a partial sectional side view of the fitting and multi-double block and bleed system of FIG. 2 with a first vent valve open.
Figure 9:
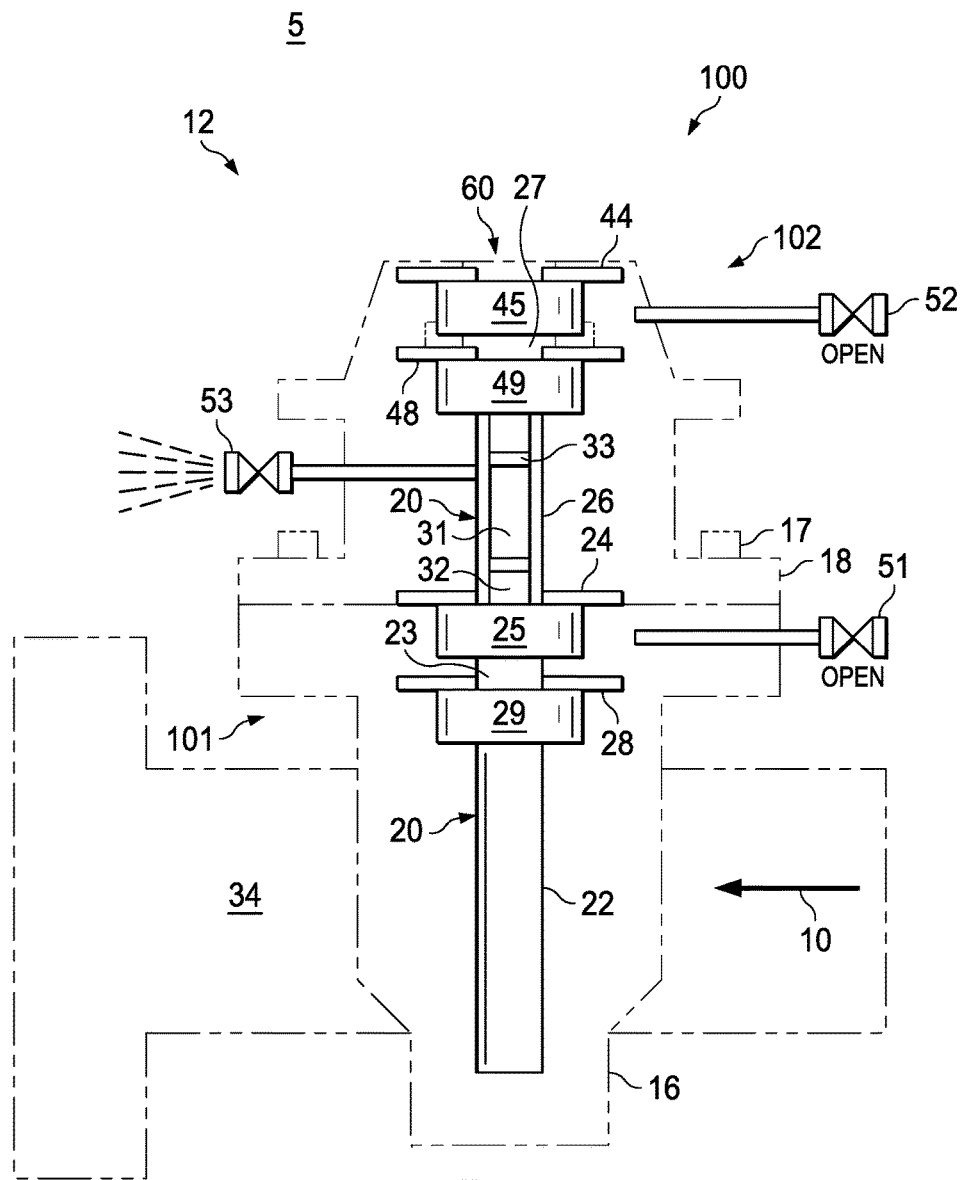
FIG. 9 is a partial sectional side view of the fitting and multi-double block and bleed system of FIG. 2 with a third vent valve open.

Referring now to FIGS. 5-9, the orifice plate carrier 32 is moved into upper chamber 26 (FIG. 5). Once orifice plate carrier 32 is entirely within upper chamber 26 and between upper blocking valve 49 and lower blocking valve 25, bottom blocking valve 29 is closed (FIG. 6) followed by the closure of the lower blocking valve 25 (FIG. 7). The upper chamber 26 is thus isolated from pipeline 34 and lower chamber 22. Vent valve 51 is opened to relieve any pressure within the lower blocking valve chamber 23 between the lower and bottom blocking valves 25, 29, respectively (FIG. 8), and vent valve 53 is opened to relieve any pressure within the upper chamber 26 between the upper and lower blocking valves 49, 25, respectively (FIG. 9).

Figure 10:
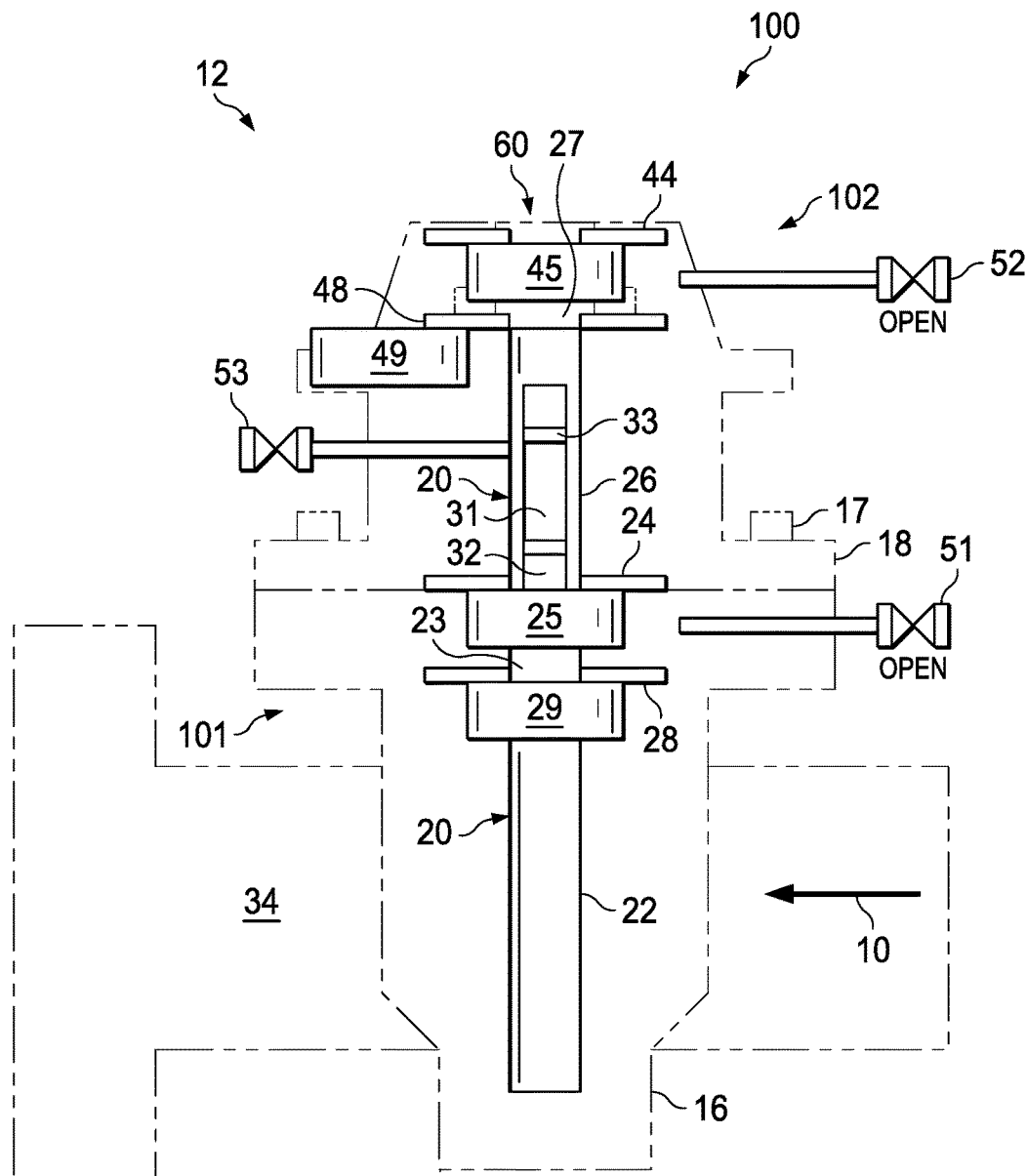
FIG. 10 is a partial sectional side view of the fitting and multi-double block and bleed system of FIG. 2 with an upper blocking valve open.
Figure 11:
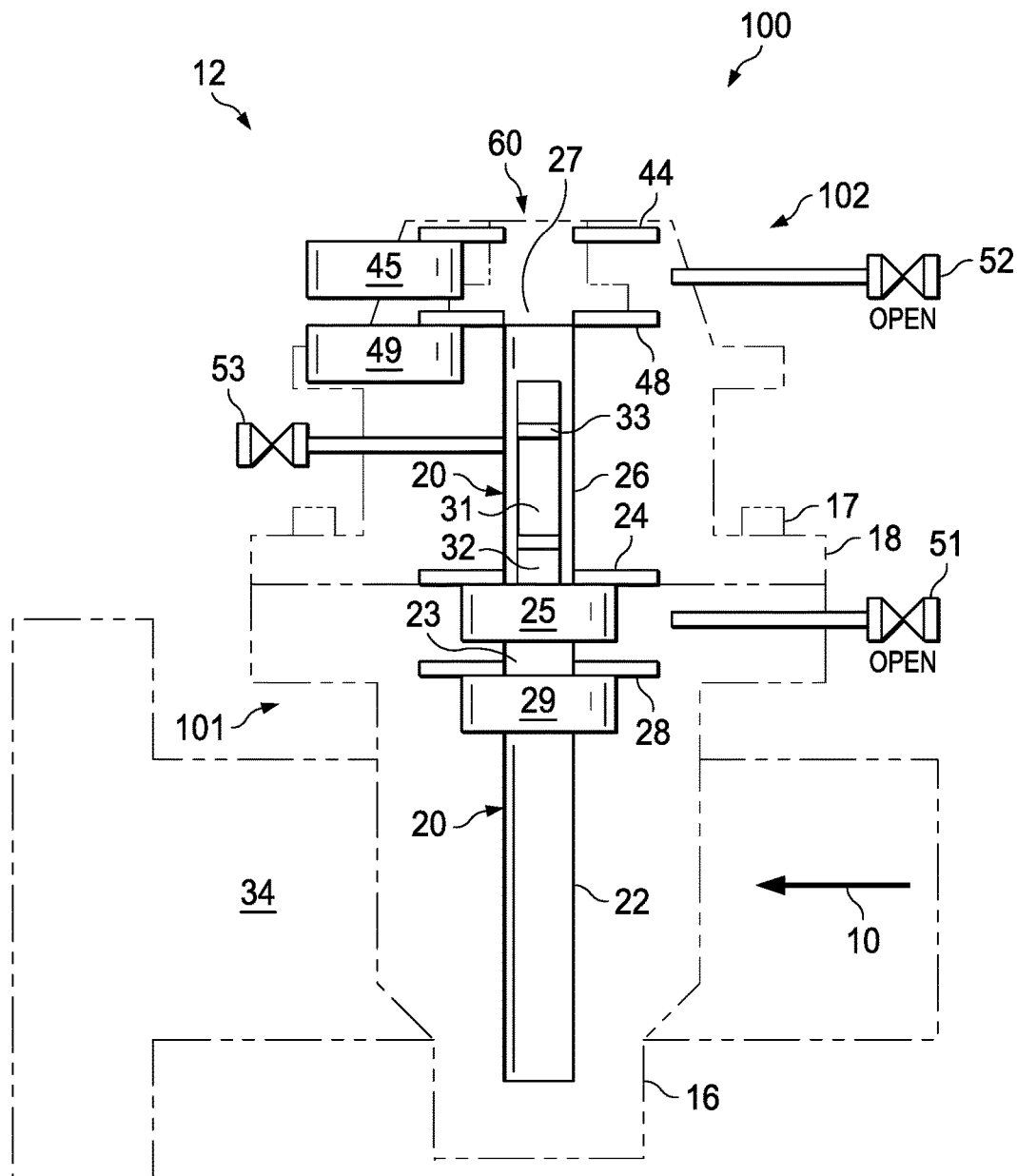
FIG. 11 is a partial sectional side view of the fitting and multi-double block and bleed system of FIG. 2 with a top blocking valve and the upper blocking valve open.
Figure 12:
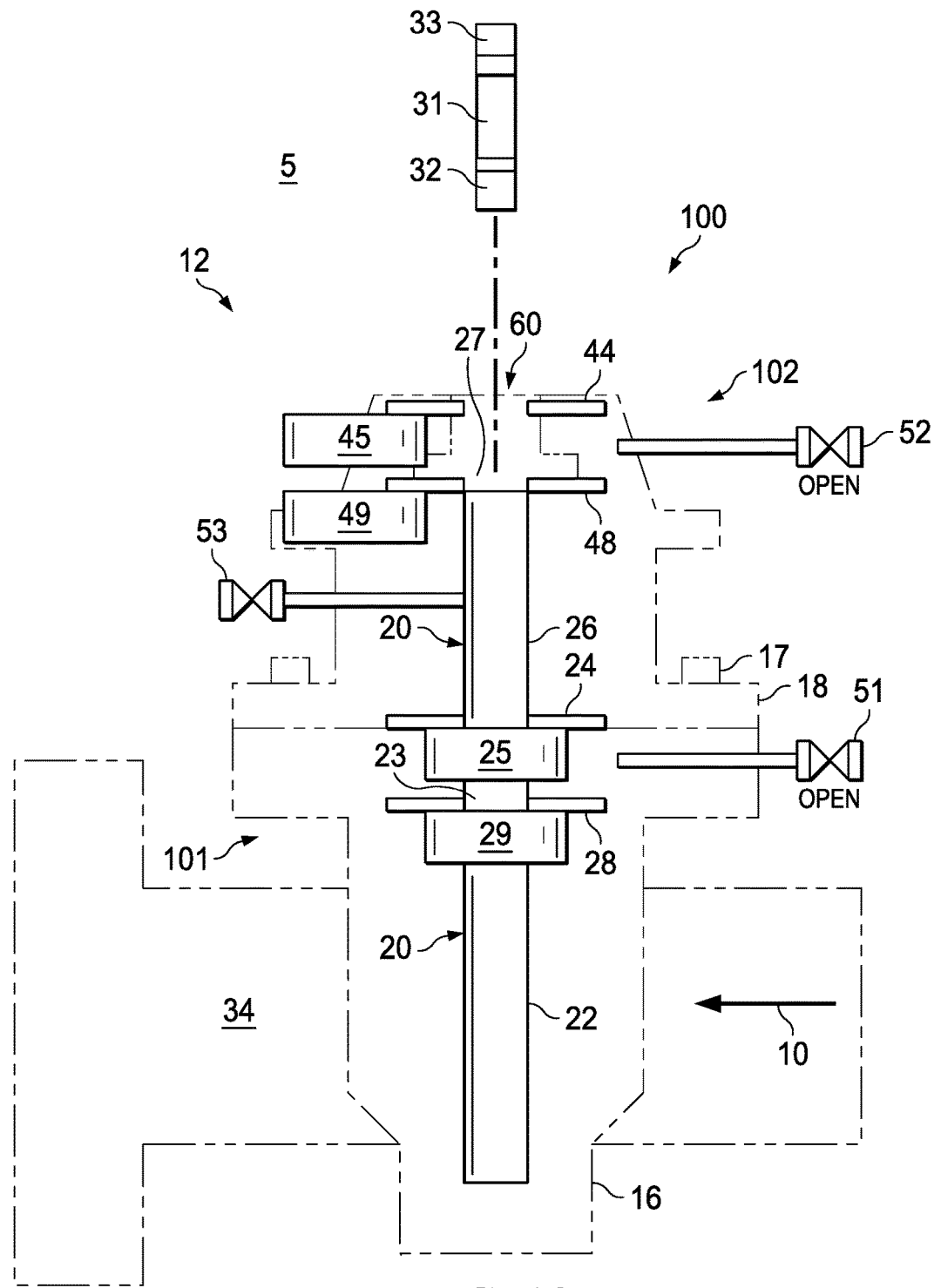
FIG. 12 is a partial sectional side view of the fitting and multi-double block and bleed system of FIG. 2 with the orifice plate removed from the fitting.

Referring now to FIGS. 10-12, the third vent valve 53 is closed (FIG. 10). Rotating gear shafts are actuated to slide top and upper blocking valves 45, 49, respectively, laterally and away from top and upper valve seats 44, 48, respectively. The upper blocking valve 49 is opened (FIG. 10) and then the top blocking valve 45 is opened (FIG. 11), placing the upper chamber 26 above the lower blocking valve 25, the upper blocking valve chamber 27, and the opening 60 in fluid communication with the environment or work area 5. The lower blocking valve 25 and bottom blocking valve 29 are closed, providing double block and bleed protection between the energy source 10 in the pipeline 34 and the environment 5. The orifice plate carrier 32 is removed from the orifice plate transfer passage 20 in the upper chamber 26 (FIG. 12). The orifice plate carrier 32 can be removed from flowmeter 12 by actuating rotating gear shafts (not shown) to slide top and upper slide valves 45, 49, respectively, laterally and away from top and upper valve seats 44, 48, respectively, and expose opening 60.

To reinstall the orifice plate carrier 32 with orifice plate 33, the first, second, and third vent valves 51, 52, 53, respectively, are all closed. The previously described steps are performed in reverse order with the first, second, and third vent valves 51, 52, 53, respectively, remaining closed during the entire process.

The multi-double block and bleed system 100 provides a double block and bleed configuration during every step of the removal or installation of an orifice plate 32 in a dual chamber orifice flowmeter. Either the first or lower pair of blocking valves 101 or the second or upper pair of blocking valves 102 is closed with the corresponding intervening vent valve 51, 52, respectively, opened to vent in a double block and bleed configuration during each phase of removing or installing an orifice plate 32. For example, in FIGS. 3-9, top blocking valve 45 and upper blocking valve 49 are closed and second vent valve 52 is open providing a double block and bleed configuration between at least the flow stream or energy source 10 and the work area or environment 5, and in some cases additional intervening valves (lower blocking valve 25 in FIG. 3; lower and bottom blocking valves 25, 29 in FIG. 9) are also closed. One can appreciate that the configuration of valves 25, 29, 45, 49, 51, 52, 53 represents a quadruple block and bleed configuration. Further, in FIGS. 8-12, lower blocking valve 25 and bottom blocking valve 29 are closed and first vent valve 51 is open providing a double block and bleed configuration between the flow stream or energy source 10 and the portion of the orifice plate transfer passage 20 located above the lower blocking valve 25.

The multi-double block and bleed system 100 further allows leaks in the valves to be identified. Once an intervening vent valve (e.g., 51 or 52) is open between a pair of closed blocking valves (e.g., 101 or 102), any additional fluid that enters the corresponding portion of the orifice plate transfer passage 20 between the pair of closed blocking valves from the flow stream 10 is passing thought a leak in the blocking valve adjacent the flow stream 10.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A multi-double block and bleed system for use with an orifice fitting, the multi-double block and bleed system comprising:
    an orifice plate transfer passage through which an orifice plate is moved in the flowmeter;
    four blocking valves disposed in series in the orifice plate transfer passage, each of the blocking valves configured to block escape of fluid from the flowmeter through the orifice plate transfer passage; and
    three vent valves, each of the vent valves disposed between two adjacent ones of the blocking valves, and configured to provide an outlet for fluid in the orifice plate transfer passage;
    wherein the four blocking valves comprise:
        a bottom valve that is adjacent to a lower chamber of the flowmeter;
        a lower valve that is adjacent to the bottom valve;
        a top valve that is farthest of the blocking valves from the lower chamber; and
        an upper valve that is disposed between the lower valve and the top valve.

2. The system of claim 1, wherein a distance between the lower valve and the upper valve is at least as great as a length of an orifice plate carrier used in the flowmeter.

3. The system of claim 1, wherein the bottom valve and the lower valve are openable to allow an orifice plate carrier to be positioned between the lower valve and the upper valve while the top valve and the upper valve are closed.

4. The system of claim 3, wherein the top valve and the upper valve provide double blocking that isolates the lower chamber from an environment external to the flowmeter while the lower valve and the bottom valve are open.

5. The system of claim 1, wherein the top valve and the upper valve are openable to allow an orifice plate carrier to be positioned between the lower valve and the upper valve while the lower valve and the bottom valve are closed.

6. The system of claim 5, wherein the lower valve and the bottom valve provide double blocking that isolates the lower chamber from an environment external to the flowmeter while the top valve and the upper valve are open.

7. The system of claim 1, wherein distance between the top valve and the upper valve, and distance between the bottom valve and the lower valve is less than distance between the upper valve and the lower valve.

8. The system of claim 1, wherein a first of the vent valves is disposed between the bottom valve and the lower valve and is openable, while the bottom valve and the lower valve are closed, to vent fluid trapped between the bottom valve and the lower valve; a second of the vent valves is disposed between the upper valve and the top valve and is openable, while the upper valve and the top valve are closed, to vent fluid trapped between the upper valve and the top valve; and a third of the vent valves is disposed between the lower valve and the upper valve and is openable, while the lower valve and the upper valve are closed, to vent fluid trapped between the lower valve and the upper valve.

9. The system of claim of claim 1, wherein the lower valve and the bottom valve are configured to allow the detection of leaks in the bottom valve while the bottom valve and the lower valve are closed and the first vent valve is open; the top valve and the upper valve are configured to allow the detection of leaks in the upper valve while the upper valve and the top valve are closed and the second vent valve is open; the upper valve and the lower valve are configured to allow the detection of leaks in the lower valve while the lower valve and the upper valve are closed and the third vent valve is open.

10. A method for providing a multi-double block and bleed configuration for an orifice fitting, the method comprising:
    opening a bottom valve of a first pair of valves disposed between an upper chamber of the flowmeter and a lower chamber of the flowmeter, and above an orifice plate disposed in the lower chamber, the orifice plate being in fluid communication with a pipeline;
    maintaining a lower valve of the first pair of valves in a closed position;
    maintaining a second pair of valves, disposed above the first pair of valves and in the upper chamber of the flowmeter, in a closed position;
    maintaining a first vent valve, disposed between the lower and bottom valves of the first pair of valves, in a closed position;
    opening a second vent valve disposed between valves of the second pair of valves; and
    maintaining a third vent valve, disposed in the upper chamber above the first pair of valves and below the second pair of valves, in a closed position.

11. The method of claim 10, further comprising opening the lower valve of the first pair of valves, and moving the orifice plate from the lower chamber to the upper chamber of the flowmeter, wherein the second pair of valves provides double blocking that isolates the pipeline from an environment external to the flowmeter while the lower valve and the bottom valve are open.

12. The method of claim 11, further comprising closing the bottom valve and lower valve such that the orifice plate is disposed between the first pair of valves and the second pair of valves, and opening the first vent valve to vent any fluid between the lower valve and the bottom valve.

13. The method of claim 12, further comprising opening the third vent valve to vent any fluid between an upper valve of the second pair of valves and the lower valve, and closing the second vent valve.

14. The method of claim 13, further comprising closing the third vent valve and opening the upper valve and a top valve of the second pair of valves, and moving the orifice plate from the upper chamber to a work area external from the flowmeter, wherein the lower valve and the bottom valve provide double blocking that isolates the flew tuhepipeline from the environment external to the flowmeter while the top valve and the upper valve are open.

15. The method of claim 11, further comprising:
    closing the first pair of valves such that the orifice plate is disposed between the first pair of valves and the second pair of valves;
    opening the first vent valve to vent any fluid between the valves of the first pair of valves;
    opening the third vent valve to vent any fluid between the first pair of valves and the second pair of valves; and
    closing the second vent valve.

16. The method of claim 15, further comprising closing the third vent valve, and opening both valves of the second pair of valves, and moving the orifice plate from the upper chamber to a work area external from the flowmeter, wherein the first pair of valves provides double blocking that isolates the pipeline from the environment external to the flowmeter while the second pair of valves is open.

17. An orifice fitting having a multi-double block and bleed system, the fitting comprising:
    a body having a lower chamber and an upper chamber;
    an orifice plate disposed in the lower chamber and in fluid communication with a pipeline;
    four blocking valves disposed in series in an orifice plate transfer passage that extends from the pipeline through the lower and upper chambers, each of the blocking valves configured to block escape of fluid from the flowmeter through the orifice plate transfer passage; and
    three vent valves, each of the vent valves disposed between two adjacent ones of the blocking valves, and configured to provide an outlet for fluid in the orifice plate transfer passage;
    wherein the four blocking valves comprise:
        a bottom valve that is adjacent to pipeline;
        a lower valve that is adjacent to the bottom valve;
        a top valve that is farthest of the blocking valves from the pipeline; and
        an upper valve that is disposed between the lower valve and the top valve.

18. The fitting of claim 17, wherein a distance between the lower valve and the upper valve is at least as great as a length of an orifice plate carrier used in the flowmeter.

19. The fitting of claim 17, wherein the bottom valve and the lower valve are openable to allow an orifice plate carrier to be positioned between the lower valve and the upper valve while the top valve and the upper valve are closed.

20. The fitting of claim 19, wherein the top valve and the upper valve provide double blocking that isolates the pipeline from an environment external to the flowmeter while the lower valve and the bottom valve are open.

21. The fitting of claim 17, wherein the top valve and the upper valve are openable to allow an orifice plate carrier to be positioned between the lower valve and the upper valve while the lower valve and the bottom valve are closed.

22. The fitting of claim 21, wherein the lower valve and the bottom valve provide double blocking that isolates the pipeline from an environment external to the flowmeter while the top valve and the upper valve are open.

23. The fitting of claim 17, wherein distance between the top valve and the upper valve, and distance between the bottom valve and the lower valve is less than distance between the upper valve and the lower valve.

24. The fitting of claim 17, wherein a first of the vent valves is disposed between the bottom valve and the lower valve and is openable, while the bottom valve and the lower valve are closed, to vent fluid trapped between the bottom valve and the lower valve; a second of the vent valves is disposed between the upper valve and the top valve and is openable, while the upper valve and the top valve are closed, to vent fluid trapped between the upper valve and the top valve; and a third of the vent valves is disposed between the lower valve and the upper valve and is openable, while the lower valve and the upper valve are closed, to vent fluid trapped between the lower valve and the upper valve.

25. The fitting of claim 17, wherein the lower valve and the bottom valve are configured to allow the detection of leaks in the bottom valve while the bottom valve and the lower valve are closed and the first vent valve is open; the top valve and the upper valve are configured to allow the detection of leaks in the upper valve while the upper valve and the top valve are closed and the second vent valve is open; the upper valve and the lower valve are configured to allow the detection of leaks in the lower valve while the lower valve and the upper valve are closed and the third vent valve is open.

\* \* \* \* \*

UNITED STATES PATENT AND TRADEMARK OFFICE
CERTIFICATE OF CORRECTION

PATENT NO. : 10,036,512 B2
APPLICATION NO. : 14/963950
DATED : July 31, 2018
INVENTOR(S) : Loga et al.

It is certified that error appears in the above-identified patent and that said Letters Patent is hereby corrected as shown below:

In the Claims

Column 6, Claim 1, Line 5: Replace "the" with "a"

Column 7, Claim 9, Line 1: Delete first occurrence of "of claim"

Column 7, Claim 9, Line 2: Delete second occurrence of "the"

Column 7, Claim 9, Line 5: Delete "the"

Column 7, Claim 9, Line 9: Delete first occurrence of "the"

Column 7, Claim 10, Line 5: Replace "the" with "a"

Column 8, Claim 17, Line 9: Replace "the" with "a"

Column 8, Claim 17, Line 17: Before "pipeline" insert --the--

Column 9, Claim 25, Line 2: Delete second occurrence of "the"

Column 9, Claim 25, Line 5: Delete "the"

Column 9, Claim 25, Line 9: Delete first occurrence of "the"

Signed and Sealed this
Twenty-first Day of February, 2023

Katherine Kelly Vidal
*Director of the United States Patent and Trademark Office*